Patented June 20, 1939

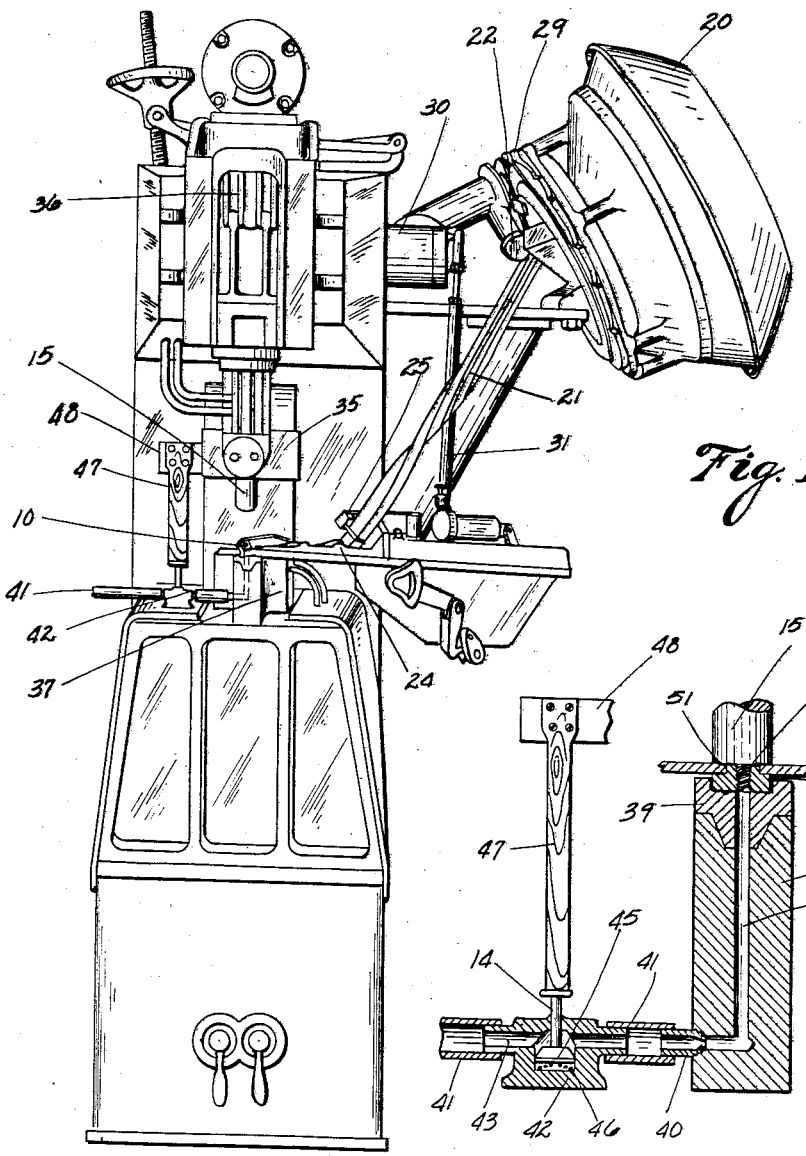

2,162,868

UNITED STATES PATENT OFFICE 2,162,868

WELDING MACHINE

William E. Smith, Detroit, Mich., assignor to The Midland Steel Products Company, Cleveland, Ohio, a corporation of Ohio Application September 22, 1936, Serial No. 101,990

6 Claims. (Cl. 219—4)

This invention relates to new and useful improvements in welding machines and an object of the invention is to provide means for removing the welding flash from the work piece during welding of the latter.

Another object of the invention is to provide means for retaining the welding flash in suspension during a welding cycle to prevent the latter from depositing on the work piece.

A further object of the invention is to provide a valve operated by a movable electrode of the welding machine to control the flow of compressed air and prevent the welding flash from depositing on the work piece while the latter is being welded, thereby preventing the welding flash from being magnetically attracted to and being welded on the work piece.

Other objects and advantages of the invention will become apparent during the course of the following description.

In the accompanying drawing forming a part of this application and wherein like numerals are employed to designate like parts throughout the several views:

Fig. 1 is a front elevational view of the welding machine, and

Fig. 2 is an enlarged sectional view of the control valve and passage through the lower electrode to the work piece.

Briefly the apparatus is designed for preventing the welding dust or flash from being attached to the threads and about the opening of a nut 10 that is being welded to a metal plate 11. During the actual welding operation, that is, when the current is flowing through the nut 10 and plate 11, a certain amount of metal is displaced a portion of which takes the form of welding flash or dust, such as small particles of steel, which have a very high affinity for magnetic attraction, and therefore the nut which becomes magnetized during the welding operation will attract the steel dust and the latter will be deposited and attached to the nut upon the threads thereof.

This flash could be removed in some instances by de-magnetizing the nut 10 and then agitating the metal plate 11 and nut 10 and in other instances the flash would have to be forcibly removed. This procedure hovewer is not practical especially where the nut 10 is welded to a large metal plate or object, for example a chassis of an automobile which is subsequently painted, for it would be impractical to de-magnetize the nut and then agitate an automobile chassis to remove the flash from the threads of a small nut. Furthermore, in production lines, such time cannot be wasted to go through these many operations.

To overcome these difficulties I have provided a welding electrode 13 having a passage 38 connected to a source of fluid pressure controlled by a valve 14 actuated by the movable electrode 15, to subject the threads of the nut 10 to a blast of air and thereby prevent the welding dust from settling and becoming attached to the threads of the nut.

The apparatus including a welding and feeding machine of the type described in my copending application Serial No. 43,393 filed October 3, 1935. The feeding mechanism comprises a rotatable hopper 20 into which is dumped a quantity of unarranged nuts 10 which are fed downwardly in an inclined chute 21 from which a sorting device 22 removes improperly disposed nuts and transfers them back into the hopper to be again fed to the chute which is twisted intermediate its ends through 180 degrees to dispose the open side of the chute at the underside of its lower end. The nuts are transferred from the chute 21 to a shuttle 24 by a transfer mechanism 25 and are fed one by one by the shuttle 24 between the electrodes 13 and 15 upon each separation thereof. The hopper is rotated whenever the upper end of the chute is devoid of nuts by means of a ratchet and pawl mechanism 29 operated by a motor 30 which also reciprocates the transfer mechanism 25 and shuttle 24 through a push rod mechanism 31.

The upper electrode 15 is mounted in a head 35 which is vertically reciprocated through a toggle mechanism 36 of the conventional construction. The lower electrode 13 is rigidly mounted on the transformer 37 and has a bore 38 extending upwardly therethrough and through a welding die 39 forming the top part of the lower electrode and which is herein shown contoured to receive the nut 10 whereby the threaded bore 50 thereof is substantially in alignment with the bore 38.

The bore 38 is connected to a suitable source of compressed air by means of a nipple 40 and conduit 41. Interposed in the conduit 41 is a valve housing 42 provided with a pasasge 43 aligned with the conduit 41 and which is controlled by a valve 45 normally held in closed position by a spring 46. The valve 45 is reciprocated to control the passage 43 by means of an electrically insulated rod 47 connected to an arm 48 fixed to the reciprocating head 35.

In operation assume that the electrodes are separated and the shuttle 24 has deposited a nut upon the lower electrode 13 and boss 51 of the nut is inserted in the corresponding opening in the metal plate 11. To effect welding of the parts, the upper electrode 15 is driven down against the nut 10 and plate 11 to close the welding circuit and weld the parts together. Protraction of the upper electrode 15 also moves the valve rod 47 downwardly to open the valve 45 and communicate the bore 38 in the lower electrode 13 with a source of compressed air. The air passing through the bore 38 suspends the welding dust produced by the welding operation and prevents the same from being attracted and attached to the threads of the nut 10. The welding contact between the upper and lower electrodes with the work is not air tight whereby the blast of air passing through the bore 38 blows the welding dust therethrough out of contact with the nut 10. The blast of air not only prevents the flash from being magnetically attached to the work, but also prevents the flash from being slightly welded thereto, that is, the heat of the flash is so great as to cause it to be slightly welded to the work if allowed to deposit on the work. Upon retraction of the upper electrode 15 the valve rod 47 is moved upwardly therewith to close the valve 45 and interrupt flow of compressed air through the bore 38.

The compressed air also cools the lower electrode 13 as it passes through the bore 38.

It is to be understood that various changes in the size, shape and arrangement of parts may be resorted to without departing from the spirit of the invention or the scope of the appended claims.

I claim:

1. In a welding machine having relatively movable electrodes to accommodate work therebetween, a source of fluid pressure, means connected to the source of fluid pressure and adapted to discharge said fluid in the region of the weld to prevent the welding flash resulting from the weld from depositing on said work, and valve means operated by said relative movement of said electrodes to permit said fluid to be discharged in said welding region upon approach of said electrodes toward each other.

2. In a welding machine having a fixed electrode and a reciprocable electrode to accommodate work therebetween, a source of compressed air, said fixed electrode having a passage therein communicating with the source of compressed air and adapted to discharge compressed air in the region of the weld to suspend the welding flash resulting from the weld, and valve means operated by said movable electrode when the latter moves to welding position to open said valve means and permit said compressed air to be discharged in said welding region and prevent said welding flash from depositing on said work.

3. In a welding machine having a fixed lower electrode and a reciprocable upper electrode, a source of compressed air, said fixed electrode being adapted to accommodate a grommet to be welded to a metal plate and provided with a passage communicating with the source of compressed air adapted to discharge compressed air through the bore of said grommet to prevent the welding flash from attaching to said bore, and valve means actuated by said upper electrode upon movement of the latter to welding position to open said valve means and permit compressed air to be discharged through said bore and prevent welding flash depositing in the bore of said grommet.

4. In a welding machine having relatively movable electrodes to accommodate apertured work pieces therebetween, a source of fluid pressure, and one of said electrodes having a passage to register with the aperture in the work piece and connected with said source of pressure whereby fluid is discharged through the aperture to prevent welding flash adhering to the walls of the aperture.

5. In a welding machine having relatively movable electrodes to accommodate apertured work pieces therebetween, a source of fluid pressure, one of said electrodes having a passage to register with the aperture in the work piece during the welding operation and connected with said source of pressure whereby fluid is discharged through said aperture, and the other electrode engaging the work piece with an irregular surface to permit the escape of fluid and welding flash between said electrode and the work piece to prevent the flash from adhering to the walls of said aperture.

6. In a welding machine having relatively movable electrodes, having irregular surfaces to engage apertured work pieces therebetween, a source of fluid pressure, one of said electrodes having a passage to register with the aperture in the work piece during the welding operation and connected with said source of pressure whereby fluid is discharged through said aperture and between the irregular surfaces of the electrodes and the work piece to permit the escape of fluid and welding flash between said electrodes and work piece to prevent the flash adhering to the walls of said aperture.

WILLIAM E. SMITH.